United States Patent
Clifford et al.

(10) Patent No.: US 10,636,004 B2
(45) Date of Patent: *Apr. 28, 2020

(54) VERIFICATION METHOD AND SYSTEM

(71) Applicant: SteadyCare, LLC, Lynnfield, MA (US)

(72) Inventors: Arthur Phillip Clifford, Lynnfield, MA (US); Patricia A. Marrin, Lynnfield, MA (US)

(73) Assignee: SteadyCare, LLC, Lynnfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/402,154

(22) Filed: May 2, 2019

(65) Prior Publication Data

US 2019/0325375 A1  Oct. 24, 2019

Related U.S. Application Data

(63) Continuation of application No. 15/637,942, filed on Jun. 29, 2017, now Pat. No. 10,296,856, which is a continuation of application No. 14/687,518, filed on Apr. 15, 2015, now Pat. No. 9,697,487, which is a continuation of application No. 14/135,028, filed on Dec. 19, 2013, now Pat. No. 9,015,079, which is a continuation of application No. 13/870,104, filed on Apr. 25, 2013, now Pat. No. 8,639,597, which is a
(Continued)

(51) Int. Cl.
| | |
|---|---|
| *G07C 1/00* | (2006.01) |
| *G06Q 10/06* | (2012.01) |
| *G06Q 10/10* | (2012.01) |
| *H04M 3/493* | (2006.01) |
| *G07C 1/10* | (2006.01) |

(52) U.S. Cl.
CPC ............ *G06Q 10/063114* (2013.01); *G06Q 10/06398* (2013.01); *G06Q 10/109* (2013.01); *G06Q 10/1091* (2013.01); *G07C 1/10* (2013.01); *H04M 3/493* (2013.01)

(58) Field of Classification Search
CPC ......... G06F 21/32; G06Q 10/06; G06Q 10/02
See application file for complete search history.

(56) References Cited

U.S. PATENT DOCUMENTS

| | | | |
|---|---|---|---|
| 5,255,183 A | 10/1993 | Katz | |
| 5,608,784 A * | 3/1997 | Miller | G06F 21/32 379/142.15 |

(Continued)

OTHER PUBLICATIONS

SteadyCare, "Features and Benefits quick guide," Business Advertisement, printed Oct. 2006, distributed Jan. 2007.
(Continued)

*Primary Examiner* — Talia F Crawley
(74) *Attorney, Agent, or Firm* — Hamilton, Brook, Smith & Reynolds, P.C.

(57) ABSTRACT

Systems and methods for verifying and monitoring employees are provided. Employees call-in to the system at scheduled times. If an employee misses a scheduled call-in, an alert can be generated. An employer notification process can generate the alert, notifying a supervisor of the employee's missed call. The alert can include the employee's name, the location of the employee, and the time he/she was supposed to call. Such systems and methods can be used to verify that a worker is at the proper location at the proper time and awake and alert during the entire time period that he/she is supposed to be working.

20 Claims, 11 Drawing Sheets

Related U.S. Application Data continuation of application No. 11/862,957, filed on Sep. 27, 2007, now Pat. No. 8,484,107.

(56) References Cited

U.S. PATENT DOCUMENTS

| | | | |
|---|---|---|---|
| 5,646,839 A | 7/1997 | Katz | |
| 5,835,575 A | 11/1998 | Stoller et al. | |
| 5,949,856 A | 9/1999 | Stoller et al. | |
| 5,963,912 A | 10/1999 | Katz | |
| 6,591,242 B1 | 7/2003 | Karp et al. | |
| 6,799,163 B2* | 9/2004 | Nolan | G07C 9/00158 379/88.02 |
| 8,484,107 B2 | 7/2013 | Clifford | |
| 8,639,597 B2 | 1/2014 | Clifford | |
| 9,015,079 B2 | 4/2015 | Clifford et al. | |
| 9,697,487 B2 | 7/2017 | Clifford et al. | |
| 10,296,856 B2 | 5/2019 | Clifford et al. | |
| 2003/0158795 A1* | 8/2003 | Markham | B23Q 35/12 705/28 |
| 2006/0281469 A1* | 12/2006 | Stoller | H04M 3/22 455/456.1 |
| 2007/0094109 A1* | 4/2007 | Perry | G06Q 10/06 705/32 |
| 2007/0132578 A1* | 6/2007 | Powell | G08B 21/023 340/539.26 |
| 2007/0203735 A1* | 8/2007 | Ashton | G06Q 10/02 705/5 |
| 2008/0041942 A1* | 2/2008 | Aissa | G06K 9/00087 235/382 |
| 2009/0086936 A1 | 4/2009 | Clifford et al. | |
| 2013/0235984 A1 | 9/2013 | Clifford | |
| 2014/0304018 A1 | 10/2014 | Clifford et al. | |

OTHER PUBLICATIONS

The Daily Item, "SteadyCare outfits Bridgewell's Special Olympic Team," Oct. 10, 2006.
"SteadyCare, A Link to Your Employees," Business Advertisement, printed Oct. 2006, distributed Jan. 2007.
Bracknell Forest Borough Council, The Borough of Opportunity, "Lone Worker Monitoring" <http://www.bracknell-forest.gov.uk/living/liv-forestcare/living-lone-worker-monitoring.htm>, downloaded Dec. 2005.
Isle of Wight, "Lone Worker Monitoring" <http://www.iwight.com/council/departments/wightcare/Lone_Worker>.
"Sandata Technologies, Inc. Adds TeleTimecard to its Service Offering" <http://www.santrax.com/news.cfm?newssel=10> accessed Mar. 17, 2008.
"Welcome to Santrax, Santrax Benefits" <http://www.santrax.com/> accessed Mar. 17, 2008.
"Industry Solutions, Home Health Agencies" <http://santrax.com/hha.cfm> accessed Mar. 17, 2008.
"Industry Solutions, Human Service Agencies" <http://www.santrax.com/hsa.cfm> accessed Mar. 17, 1008.
"Industry Solutions, Government" <http://www.santrax.com/government.cfm> accessed Mar. 17, 2008.
"Product Features, Data Collection" <http://santrax.com/inoutcalls.cfm> accessed Mar. 17, 2008.
"Product Features, Management Reports" <http://www.santrax.com/management.cfm> accessed Mar. 17, 2008.
"Product Features, Optional Features and Alerts" <http://www.santrax.com/options.cfm> accessed Mar. 17, 2008.
"Product Features, How it Works" <http://www.santrax.com/howitworks.cfm> accessed Mar. 17, 2008.
"Product Features, Santrax Savings Calculator" <http://www.santrax.com/roi.cfm> accessed Mar. 17, 2008.
"Product Demos, Schedule a Demo" <http://www.santrax.com/schedule_demo.cfm> accessed Mar. 17, 2008.
"About Us, President's Letter" <http://www.santrax.com/president.cfm> accessed Mar. 17, 2008.
"About Us, History" <http://www.santrax.com/history.cfm> accessed Mar. 17, 2008.
"FindLaw, Sandata Technologies, Inc. Adds TeleTimecard to its Service Offering" <http://news.corporate.findlaw.com/prnewswire/20080221/21feb20080918.html (Accessed May 21, 2008).
"Sandata Technologies, Inc. Adds TeleTimecard to its Service Offering Feb. 21, 2008" <http://www.sandata.com/news.cfm?newssel=1> (Accessed May 21, 2008).
"Sandata Technologies, Inc. and Personal-Touch Home Care of N.Y., Inc. Join Forces to Provide Visit Management Solution Jan. 31, 2008" <http://www.sandata.com/news.cfm?newssel=7> (Accessed May 21, 2008).
"Sandata Technologies and ADP to Market Remote Workforce Management Solution Jan. 16, 2008" <http://www.sandata.com/news.cfm?newssel=4> (Accessed May 21, 2008).
"Sandata Technologies and ADP to Market Remote Workforce Management Solution Jan. 16, 2008" <http://www.sandata.com/news.cfm?newssel=4> (Accessed May 21, 2008).
"Sandata Technologies and First Data Government Solutions Join Forces to Provide Visit Management Solution Jul. 23, 2007" <http://www.sandata.com/news.cfm?newssel=6> (Accessed May 21, 2008).
"Sandata Technologies, Inc. and Dataline Inc. to Merge;Expands Capabilities in Health Care and Social Services May 14, 2007" <http://www.sandata.com/news.cfm?newssel=8> (Accessed May 21, 2008).
"NDSI Healthcare and Sandata Technologies Announce Integration of Home Health Software and Telephony Technology Nov. 17, 2006" <http://www.sandata.com/news.cfm?newssel=9> (Accessed May 21, 2008).
"The Child Welfare Insurance Program Offers 5% Discount for Agencies Using Santrax for Child Welfare" <http://www.sandata.com/news.cfm?newssel=3> (Accessed May 21, 2008).
"Santrax Brochure Nov. 16, 2005" <www.sandata.com/images/whitepapers/SantraxBrochure.pdf> (Accessed May 21, 2008).
"Missouri Home Care to Implement Telephony Sep. 15, 2005" <http://www.sandata.com/news.cfm?newssel=5> (Accessed May 21, 2008).
"Long Island Business News Article—Sandata Patent Acquisition Aug. 12, 2005" <www.sandata.com/images/whitepapers/As seen 81205 Sandata-for website.pdf> (Accessed May 21, 2008).
"The State of North Carolina Accepts Santrax Telephony for Home Care Aug. 2005" <www.sandata.com/images/news/NC - Telephony letter 2.pdf> (Accessed May 21, 2008).
"Sandata Technologies Aquires MCI Patents Aug. 2005" <http://www.sandata.com/news.cfm?newssel=1> (Accessed May 21, 2008).
"Sandtrax Product Features, Data Collection" <http://www.santrax.com/inoutcalls.cfm> (Accessed May 21, 2008).
"Sandtrax Product Features, Management Reports" <http://www.santrax.com/management.cfm> (Accessed May 21, 2008).
"Sandtrax Product Features, How it Works" <http://www.santrax.com/howitworks.cfm> (Accessed May 21, 2008).
"Sandtrax Product Features, Savings Calculator" <http://www.santrax.com/roi.cfm> (Accessed May 21, 2008).
"MITC Software, Welcome to MITC" <http://www.mitcsoftware.com/index.html> (Accessed Apr. 1, 2008.
"MITC Software, Timekeeping Technology—Telephone" <http://www.mitcsoftware.com/technology/telephone.html> (Accessed Apr. 1, 2008).
"MITC Software, Timekeeping Technology—Time Data Terminal" <http://www.mitcsoftware.com/technology/timedata_terminal.html> (Accessed Apr. 1, 2008).
"MITC Software, Timekeeping Technology—Biometric Terminal" <http://www.mitcsoftware.com/technology/biometric_terminal.html> (Accessed Apr. 1, 2008).
"MITC Software, Timekeeping Technology—PC" <http://www.mitcsoftware.com/technology/pc.html> (Accessed Apr. 1, 2008).
"MITC Software, Timekeeping Technology—Mobile Infrared Scanners" <http://www.mitcsoftware.com/technology/mobile_scanners.html> (Accessed Apr. 1, 2008).
"MITC Software, Timekeeping Technology—Internet" <http://www.mitcsoftware.com/technology/internet.html> (Accessed Apr. 1, 2008).

(56) References Cited

OTHER PUBLICATIONS

"MITC Software, Timekeeping Technology—Unique Solutions" <http://www.mitcsoftware.com/technology/unique_solutions.html> (Accessed Apr. 1, 2008).
"MITC Software, Administration" <http://www.mitcsoftware.com/solutions/administration.html> (Accessed May 21, 2008).
"MITC Software, Payroll Costs" <http://www.mitcsoftware.com/solutions/payroll_costs.html> (Accessed May 21, 2008).
"MITC Software, Overtime" < http://www.mitcsoftware.com/solutions/overtime.html> (Accessed May 21, 2008).
"MITC Software, Service" <http://www.mitcsoftware.com/solutions/service.html> (Accessed May 21, 2008).
"MITC Software, Quality Assurance" <http://www.mitcsoftware.com/solutions/quality_assurance.html> (Accessed May 21, 2008).
"MITC Software, Increased Productivity" <http://www.mitcsoftware.com/solutions/increase_productivity.html> (Accessed May 21, 2008).
"MITC Software, Scheduling" <http://www.mitcsoftware.com/solutions/scheduling.html> (Accessed May 21, 2008).
"MITC Software, Personnel Management" <http://www.mitcsoftware.com/solutions/personnel_mgmt.html> (Accessed May 21, 2008).
"MITC Software, Labor Management" <http://www.mitcsoftware.com/solutions/labor_mgmt.html> (Accessed May 21, 2008).
"MITC Software, Payroll/Billing Integration" <http://www.mitcsoftware.com/solutions/payroll_billing.html> (Accessed May 21, 2008).
"MITC Software, Payroll and Accounting" <http://www.mitcsoftware.com/payroll_accounting.html> (Accessed May 21, 2008).
"A.L.Wizard, A.L.Wizard Solution" <http://www.alwizard.com/Demo-n-Tour.html> (Accessed Mar. 24, 2008).
"A.L.Wizard, Our Company" <http://www.alwizard.com/OurCompany.html> (Accessed May 21, 2008).
"A.L.Wizard, The Wizard Difference" <http://www.alwizard.com/OurCompany.html> (Accessed May 21, 2008).
"A.L.Wizard. Resident Manager" <http://www.alwizard.com/ResidentManager.html> (Accessed May 21, 2008).
"A.L.Wizard, Staff Manager" <http://www.alwizard.com/StaffManager.html> (Accessed May 21, 2008).
"A.L.Wizard, StaffTracking" <http://www.alwizard.com/StaffTracking.html> (Accessed May 21, 2008).
"A.L.Wizard, Billing Manager" <http://www.alwizard.com/BillingManager.html> (Accessed May 21, 2008).
"A.L.Wizard, Marketing Manager" <http://www.alwizard.com/MarketingManager.html> (Accessed May 21, 2008).
"A.L.Wizard, Corporate Oversight" <http://www.alwizard.com/CentralCoordination.html> (Accessed May 21, 2008).
"A.L.Wizard, Assisted Living Today, Oct. 2000 Issue, What should be the Role of the Nurse in Assisted Living?" <http://www.alwizard.com/PUBS00000.html> (Accessed May 21, 2008).
"A.L.Wizard, HIPAA, Assisted Living and A.L. Wizard" <http://www.alwizard.com/docs/Hippa_Statement1-03.pdf> (Accessed May 21, 2008).
"A.L.Wizard, Good Neighbor Care to Implement A.L. Wizard Software Across communities Nationwide" <http://www.alwizard.com/PR0609070.html> (Accessed May 21, 2008).
"A.L.Wizard, Atria Senior Living Group Rolls Out A.L. Wizard to Rest of Portfolio" <http://www.alwizard.com/PR0508010.html> (Accessed May 21, 2008).
"A.L.Wizard, A.L. Wizard Reduces the Risk of Quality Care at Senior Lifestyle Corporation" <http://www.alwizard.com/PR0507070.html> (Accessed May 21, 2008).
"A.L.Wizard, A.L. Wizard Extends Assisted Living Solution with Marketing Capabilities" <http://www.alwizard.com/PR0310020.html> (Accessed May 21, 2008).
"A.L.Wizard, A.L. Wizard Raises Revenues for Assisted Living Communities" <http://alwizard.com/PR0309050.html> (Accessed May 21, 2008).
"A.L.Wizard, A.L. Wizard Selected by ARV Assisted Living to Automate Management at 60 Communities" <http://alwizard.com/PR0209100.html> (Accessed May 21, 2008).
"A.L.Wizard, Kisco Retirement Communities Selects A.L.Wizard Software to Manage Resident Care" <http://alwizard.com/PR0209000.html> (Accessed May 21, 2008).
"A.L.Wizard, Fountains Retirement Communities Selects A.L. Wizard" <http://alwizard.com/PR0204280.html> (Accessed May 21, 2008).
"A.L.Wizard, Beacon Communities Speeds information Access with A.L.Wizard" <http://alwizard.com/PR0204220.html> (Accessed May 21, 2008).
"A.L.Wizard, San Diego—Feb. 23, 2002—A.L.Wizard, Inc. and Pointivity, Inc., two San Diego based technology companies, announced today that they have formed a partnering agreement" <http://alwizard.com/PR0202230.html> (Accessed May 21, 2008).
"McKesson International, Horizon Homecare Telephony" <htip://www.mckesson.com/en_us/McKesson.com/For%2BHealthcare%2BProviders/Home> (Accessed Mar. 27, 2008).
"McKesson International, Horizon Homecare Web Chart" <http://www.mckesson.com/en_us/McKesson.com/For%2BHealthcare%2BProviders/Home%2BCare/Care%2BDelivery/Horizon%2BHomecare%2BWeb%2BChart.html> (Accessed May 21, 2008).
"McKesson International, Horizon Homecare Advanced Clinicals" <http://www.mckesson.com/en_us/McKesson.com/For%2BHealthcare%2BProviders/Home%2BCare/Care%2BDelivery/Horizon%2BHomecare%2BAdvanced%2BClinicals.html > (Accessed May 21, 2008).
"McKesson International, Horizon Homecare" <http://www.mckesson.com/en_us/McKesson.com/For%2BHealthcare%2BProviders/Home%2BCare/Care%2BDelivery/Horizon%2BHomecare.html> (Accessed May 21, 2008).
"McKesson International, The Homecare and Hospice Guide to Point-of-Care" <www.mckesson.com/static_files/McKesson.com/MPT/Documents/Homecare_POC%20Technology_WHT179[1].pdf> (Accessed May 21, 2008).
"McKesson International, Lower Cape Fear Hospice & LifeCareCenter" <www.mckesson.com/static_files/McKesson.com/MPT/Documents/Lower_Cape_Fear.pdf (Accessed May 21, 2008).
"NAHC Vendor Mall, Business Services" <http://www.nahc.org/Tango/VendorMall/VendorMall.taf?function=cat&cat=BUSSVR> (Accessed May 21, 2008).
"NAHC Vendor Mall, At Home Care Consulting" <http://www.nahc.org/Tango/VendorMall/VendorMall.taf?function=detail&id=33283> (Accessed May 21, 2008).
"NAHC Vendor Mall, HealthMEDX, Inc." <http://www.nahc.org/Tango/VendorMall/VendorMall.taf?function=detail&id=32935> (Accessed May 21, 2008).
"NAHC Vendor Mall, Pearce Financial Group" <http://www.nahc.org/Tango/VendorMall/VendorMall.taf?function=detail&id=33286> (Accessed May 21, 2008).
"NAHC Vendor Mall, Simione Consultants,LLC" <http://www.nahc.org/Tango/VendorMall/VendorMall.taf?function=detail&id=33032> (Accessed May 21, 2008).
"NAHC Vendor Mall, TAG Marketing & Recruiting" <http://www.nahc.org/Tango/VendorMall/VendorMall.taf?function=detail&id=33041> (Accessed May 21, 2008).
"NAHC Vendor Mall, Acucare Health Strategies Inc." <http://www.nahc.org/Tango/VendorMall/VendorMall.taf?function=detail&id=33479> (Accessed May 21, 2008).
"NAHC Vendor Mall, Boyd & Nicholas, Inc." <http://www.nahc.org/Tango/VendorMall/VendorMall.taf?function=detail&id=32891> (Accessed May 21, 2008).
"NDSI Healthcare, Inc., Web Resources & Links" <htlp://www.ndsihealthcare.com/resour.aspx> (Accessed May 21, 2008).
"Total Census Solutions, Do You Have Confidence in the Way Your Calls are Handled?" (Brochure).
"Visiting Nurse Association of America 25th Annual Meeting, Sandata Technologies, Inc./Santrax" (Apr. 25-27, 2007).
http://www.datamaticsinc.com/ retrieved from Internet on Sep. 21, 2016.
http://www.datamaticsinc.com/our-services1/ retrieved from Internet on Sep. 21, 2016.
http://www.datamaticsinc.com/our-solutions1/ retrieved from Internet on Sep. 21, 2016.

(56) References Cited

OTHER PUBLICATIONS http://www.datamaticsinc.com/service/time-and-labor/ retrieved from Internet on Sep. 21, 2016.

http://www.datamaticsinc.com/service/time-entry-devices/ retrieved from Internet on Sep. 21, 2016.

http://www.kronos.com/products/smb-solutions/workforce-ready.aspx retrieved from Internet on Sep. 21, 2016.

http://www.kronos.com/products/smb-solutions/workforce-ready/products/timekeeping.aspx retrieved from Internet on Sep. 21, 2016.

Notice of Allowance for U.S. Appl. No. 14/687,518 "Verification Method and System," dated Mar. 9, 2017.

Notice of Allowance for U.S. Appl. No. 15/637,942 "Verification Method and System," dated Jan. 14, 2019.

\* cited by examiner

FIG. 6A

Account: 602 SteadyCare
622 — Location Name: Example House
Location Telephone: 5856627544
614 — Location Time Zone: Eastern

Last 10 Missed Calls

| Occurrence | Date/Time | Scheduled Call Time | Employee Name | Reported As Missed |
|---|---|---|---|---|
| 567 | 7/14/2007 4:19:10 PM | 9/12/2007 4:00:00 AM | Jeff | 9/12/2007 4:15:02 AM |
| 566 | 6/27/2007 8:10:25 PM | 9/12/2007 2:15:00 AM | UNKNOWN | 9/12/2007 2:30:01 AM |
| 565 | 6/27/2007 1:27:40 AM | 9/12/2007 2:00:00 AM | Jeff | 9/12/2007 2:15:01 AM |
| 564 | 6/27/2007 1:24:37 AM | 9/12/2007 1:45:00 AM | Jeff | 9/12/2007 2:00:02 AM |
| 563 | 6/27/2007 1:19:34 AM | 9/12/2007 1:30:00 AM | Jeff | 9/12/2007 1:45:02 AM |
| 562 | | 9/12/2007 1:15:00 AM | Jeff | 9/12/2007 1:30:02 AM |
| 561 | | 9/12/2007 1:00:00 AM | Jeff | 9/12/2007 1:15:02 AM |
| 560 | | 9/12/2007 12:45:01 AM | Jeff | 9/12/2007 1:00:02 AM |
| 559 | | 9/12/2007 12:30:01 AM | Jeff | 9/12/2007 12:45:02 AM |
| 558 | | 9/12/2007 12:00:01 AM | Jeff | 9/12/2007 12:15:02 AM |

608 — 604 —

612 — Send Daily Email Report Now
620 — Send Monthly Email Report Now

616 — View Detailed Report

| Check-In ID | Location Telephone | Voice Recording | Message |
|---|---|---|---|
| 149 | 5856627545 | Listen | None |
| 136 | 5856627545 | None | None |
| 128 | 5856627545 | Listen | Listen |
| 123 | 5856627545 | Listen | Listen |
| 122 | 5856627545 | Listen | None |

606 — Last 10 Calls
610 — 624 — 626 —
618 —

FIG. 6B

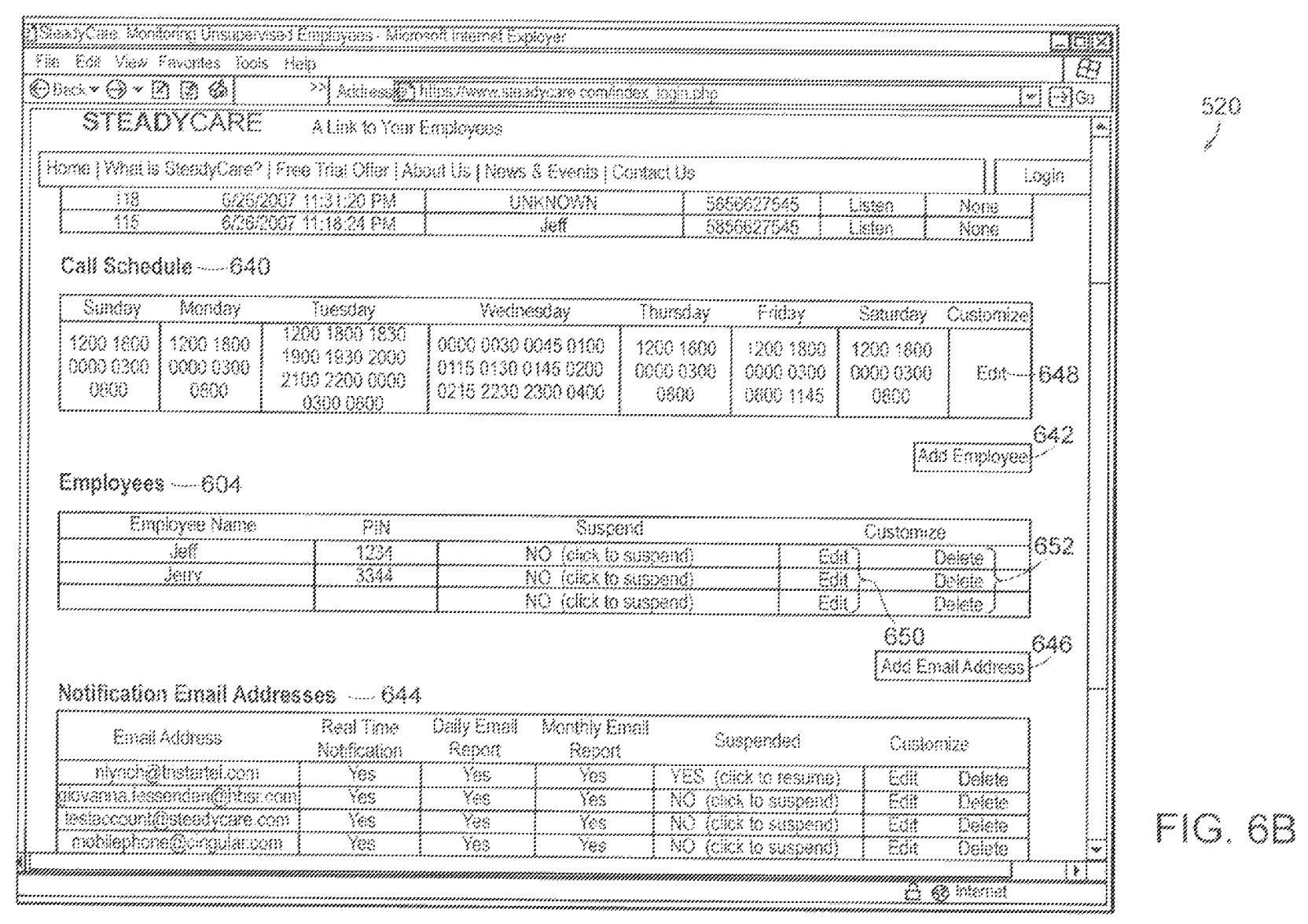

STEADYCARE — A Link to Your Employees

Home | What is SteadyCare? | Free Trial Offer | About Us | News & Events | Contact Us

Call Schedule — 640

| | Sunday | Monday | Tuesday | Wednesday | Thursday | Friday | Saturday | | |
|---|---|---|---|---|---|---|---|---|---|
| 119 | 1200 1800 0000 0300 0600 | 1200 1800 0000 0300 0600 | 1200 1800 1830 1900 1930 2000 2100 2200 0000 0300 0600 | 0000 0030 0045 0100 0115 0130 0145 0200 0215 2230 2300 0400 | 1200 1800 0000 0300 0600 | 1200 1800 0000 0300 0800 1145 | 1200 1800 0000 0300 0600 | | |
| 115 | 2/6/2007 11:31:20 PM | 2/26/2007 11:18:24 PM | UNKNOWN Jeff | | | | | None None | Listen Listen |

Employees — 604

| Employee Name | PIN | Suspend | | Customize |
|---|---|---|---|---|
| Jeff | 1234 | NO (click to suspend) | Edit — 648 | Add Employee — 642 |
| Jerry | 5344 | NO (click to suspend) | | |
| | | NO (click to suspend) | | |

Notification Email Addresses — 644

| Email Address | Real Time Notification | Daily Email Report | Monthly Email Report | Suspended | Customize | |
|---|---|---|---|---|---|---|
| myceh@ttefatel.com | Yes | Yes | Yes | YES (click to resume) | Edit | Delete |
| mcvama.lessender@thsr.com | Yes | Yes | Yes | NO (click to suspend) | Edit | Delete |
| testaccount@steadycare.com | Yes | Yes | Yes | NO (click to suspend) | Edit | Delete |
| mobilephone@cingular.com | Yes | Yes | Yes | NO (click to suspend) | Edit | Delete |

Add Email Address — 646

Schedule Details

Location Schedule

| | |
|---|---|
| Sundays | 1200 1800 0000 0300 0800 |
| Mondays | 1200 1800 0100 0300 0800 |
| Tuesdays | 1200 1800 1830 1900 1930 2100 2200 0000 0300 0800 |
| Wednesdays | 0000 0030 0045 0100 0115 0130 0145 0200 0215 2230 2300 0400 |
| Thursdays | 1200 1800 0000 0300 0800 |
| Fridays | 1200 1800 0000 0300 0800 0800 1145 |
| Saturdays | 1200 1800 0100 0300 0800 |

640

[Cancel and Go Back] [Save]

Home | About Us | Contact Us | Sitemap         ©2008 SteadyCare

STEADYCARE

One Rear Newbury St.
Suite 410
Peabody, MA 01960
(865) 578-3239

SteadyCare (Example House) - Monthly Call Report
6/1/2007 - 7/1/2007

| Time of Call | Originating Telephone Number | House | Employee | ID |
|---|---|---|---|---|
| 6/4/2007 3:19:22 PM | 5852781940 | SteadyCare (Example House) | Jeff | 1234 |
| 6/26/2007 11:07:18 PM | 5856627545 | SteadyCare (Example House) | Jeff | 1234 |
| 6/26/2007 11:18:24 PM | 5856627545 | SteadyCare (Example House) | Jeff | 1234 |
| 6/27/2007 12:00:36 AM | 5856627545 | SteadyCare (Example House) | Jeff | 1234 |
| 6/27/2007 1:19:34 AM | 5856627545 | SteadyCare (Example House) | Jeff | 1234 |
| 6/27/2007 1:21:37 AM | 5856627545 | SteadyCare (Example House) | Jeff | 1234 |
| 6/27/2007 1:27:49 AM | 5856627545 | SteadyCare (Example House) | Jeff | 1234 |

| | A | B | C | D | E |
|---|---|---|---|---|---|
| 1 | STEADYCARE | | | | |
| 2 | STEADYCARE | | | | |
| 3 | | | | | One Rear Newbury St. |
| 4 | | | | | Suite 410 |
| 5 | | | | | Peabody, MA 01960 |
| 6 | | | | | (866) 578-3239 |
| 7 | | Vita-Living (Fondren) - Daily Call Report | | | |
| 8 | | 9/12/2007 2:17:18 PM - 9/13/2007 2:17:18 PM | | | |
| | Time of Call | Originating Telephone Number | House | Employee | ID |
| 9 | 9/12/2007 10:59:51 PM | 7137745968 | Vita-Living (Fondren) | Nana Siaw | 1620 |
| 10 | 9/13/2007 12:01:36 AM | 7137745968 | Vita-Living (Fondren) | Nana Siaw | 1620 |
| 11 | 9/13/2007 12:58:13 AM | 7137745968 | Vita-Living (Fondren) | Nana Siaw | 1620 |
| 12 | 9/13/2007 2:01:09 AM | 7137745968 | Vita-Living (Fondren) | Nana Siaw | 1620 |
| 13 | 9/13/2007 2:58:01 AM | 7137745968 | Vita-Living (Fondren) | Nana Siaw | 1620 |
| 14 | 9/13/2007 3:57:58 AM | 7137745968 | Vita-Living (Fondren) | Nana Siaw | 1620 |
| 15 | 9/13/2007 4:57:48 AM | 7137745968 | Vita-Living (Fondren) | Nana Siaw | 1620 |
| 16 | 9/13/2007 5:59:10 AM | 7137745968 | Vita-Living (Fondren) | Nana Siaw | 1620 |
| 17 | 9/13/2007 7:00:00 AM | 7137745968 | Vita-Living (Fondren) | Nana Siaw | 1620 |

VERIFICATION METHOD AND SYSTEM

RELATED APPLICATIONS

This application is a continuation of U.S. application Ser. No. 15/637,942 filed on Jun. 29, 2017, which is a continuation of U.S. application Ser. No. 14/687,518 filed on Apr. 15, 2015, now U.S. Pat. No. 9,697,487, issued Jul. 4, 2017, which is a continuation of U.S. application Ser. No. 14/135,028, filed on Dec. 19, 2013, now U.S. Pat. No. 9,015,079, issued Apr. 21, 2015, which is a continuation of U.S. application Ser. No. 13/870,104, filed on Apr. 25, 2013, now U.S. Pat. No. 8,639,597, issued Jan. 28, 2014, which is a continuation of U.S. application Ser. No. 11/862,957, filed on Sep. 27, 2007, now U.S. Pat. No. 8,484,107, issued Jul. 9, 2013. The entire teachings of the above applications are incorporated herein by reference.

BACKGROUND

Many employees do not work in a single location. Many care providers, for example, provide essential help to patients, particularly the elderly and those in need of medical aid, at their respective homes or other location due to the patient's difficulty or inability to leave his or her home or residence. This care may include the administration of pharmaceutical drugs, physical therapy, conversation, food, bathing, or the like. Many of these patients depend heavily upon the services provided by their care providers.

The care providers may begin their shifts by calling-in or arriving at their patients' location. However, most of these employees' shifts are spent without any direct supervision by the employer. Unfortunately, it is not uncommon for an employee to take advantage of the lack of supervision and either show up late for his shift, leave early from his shift, or not show up at all. In addition, it is possible for an employee to make a mistake and to go to the wrong place (location) without realizing it. These problems are further compounded by virtue of the fact that many of the employees' patients are elderly, developmentally impaired and are either afraid to complain or do not realize that the care provider is not fulfilling his responsibilities. In addition, once on the job, some employees may not stay awake to fulfill their job obligations and thus expose their patients to significant risks.

Yet another concern involves the safety of the care provider. As mentioned, the care providers often meet the patients at an unfamiliar or unknown location. For cost reasons, the care providers are often alone and by themselves. While the care provider can take some precautions, the situation is sometimes dangerous by nature.

SUMMARY OF THE INVENTION

A computer implemented system and method for monitoring employees is provided. An interactive voice response system receives audio data providing a representation of an employee, for example including a representation of the employee's voice. The interactive voice response system processes the employee audio data to determine time and location parameters. The collected data is used to verify the employee's presence (location, whereabouts, or the like). For instance, the employee audio data can include an employee identifier (PIN), date/time and location information (phone number employee is calling from, etc.). An alert system generates an alert in response to a potential problem condition detected. The potential problem condition is detected using defined expectations for the employee audio data. The defined expectations include a scheduled location and a scheduled time frame for the employee audio data.

A potential problem condition can be detected by the alert system if the scheduled location and the determined location are not substantially the same. A potential problem condition can be detected by the alert system if the scheduled time frame and the determined time are not substantially the same. The scheduled time frame and the determined time are determined to be substantially the same if the difference between the scheduled time frame and the determined time frame is below a threshold time frame. The threshold time frame can be fifteen minutes.

The alert system includes a supervisor profile implementation process that enables a supervisor to define preferences for receiving alerts in response to potential problem conditions detected. The defined supervisor preferences for receiving alerts in response to potential problem conditions include a supervisor notification preference. The supervisor notification preference enables the supervisor to define the type of alert to be received. The type of alert can be any of the following: an instant message, a telephone call, voice-mail message, or an email. The defined supervisor preferences in the alert system can be specified by the supervisor using a web-based interface to the alert system. The defined expectations can be defined by the supervisor using the web-based interface.

Information concerning the employee audio data and problem conditions are stored in a secure database. The database includes a third party verification log providing information about the employee at the determined geographic location (e.g. information used to assist in the verification of the employee's location and information about the employee's call-in times). The database includes security protection measures that inhibit accessing and tampering with the database by the employee. The third party verification log has a secure architecture that enables it to be used (for example, as evidence in litigation) to verify the employee's actions at work.

The interactive voice response system includes a voice packetizer that processes the employee audio data into packets for handling by the interactive voice response system. A telephony server system interfaces with the voice packetizer. The telephony server system executes a computer telephony integration application that, in combination with the voice packetizer, implements the interactive voice response system. With this architecture, the telephony server system can handle and monitor incoming voice calls from the employee.

At least a portion of the employee audio data is a pre-recorded audio file or a dynamically generated audio stream. An authentication process is in communication with the interactive voice response system. The authentication process compares at least a portion of the employee audio data with a previously stored sample of the employee's voice. The authentication process confirms the authenticity of the employee audio data by verifying that the portion of the employee audio data and the previously stored employee voice sample are substantially the same. The authentication process can verify the authenticity of the employee audio data using an employee identifier (PIN), date/time and location information (detected phone number employee is calling from, etc.)

The present computer implemented systems and methods can be used to verify that a worker is at the proper location at the proper time and awake and alert during the scheduled call-in times.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 6A-6C are screenshots of the interface of an example portal according to an embodiment of the invention.

FIG. 7A is an example of a monthly report generated by the alert system.

FIG. 7B is an example of a daily report generated by the alert system.

DETAILED DESCRIPTION OF THE INVENTION

A description of example embodiments of the invention follows.

Monitoring and Verification System

Figure 1:
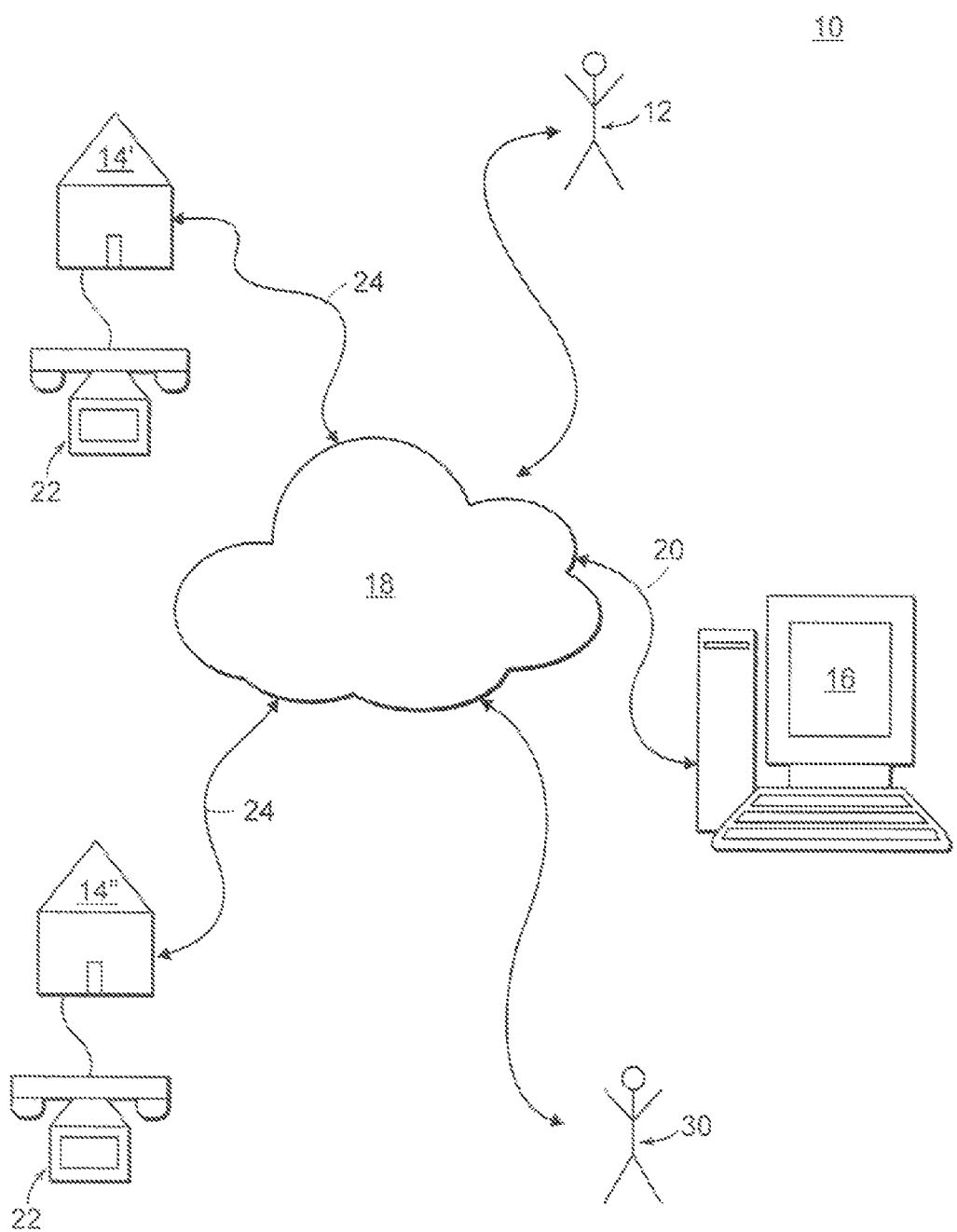
FIG. 1 is a block diagram illustrating one possible embodiment of the verification system according to the present invention.
Figure 2:
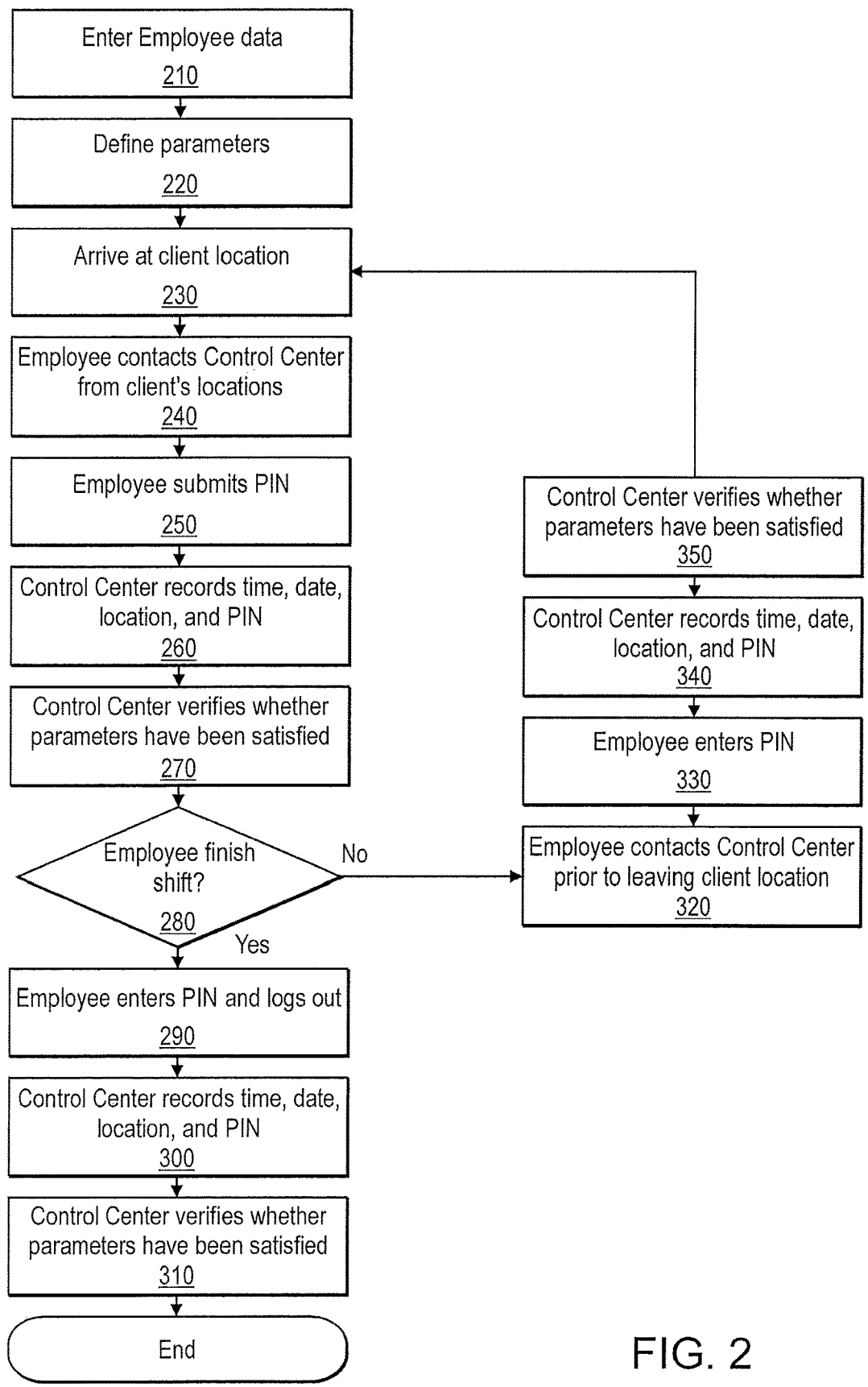
FIG. 2 is a flow chart illustrating one embodiment of the overall method of the verification system shown in FIG. 1 according to the present invention.

The present invention generally relates to employee monitoring and verification systems and more particularly, relates to systems and methods for verifying that an employee is at his or her appointed post of employment and that the employee is awake at the time they call into the system. As shown in FIG. 1, the verification system 10 and method 200, FIG. 2, is used to monitor that an individual 12, such as an employee or the like, is awake/alert and/or at the correct destinations/locations 14. The verification system 10 features a main processing unit or contact center 16 that is connected to a network 18 using any communication connection 20 (either wired or wireless) known in the art. The destinations/locations 14 are typically individual homes or the like where care needs to be provided and preferably feature a communication device 22 such as, but not limited to, a telephone, computer, or the like that is connected to the network 18 using any communication connection 24 such as, but not limited to, the public switched telephone network (PSTN), cell phone, cable, Internet, satellite or the like. For illustrative purposes only, the present invention will be described with respect to an individual employee 12 at respective work site (location 14) though this is not a limitation of the present invention.

In practice, each employee 12 who is to be monitored is given a personal identification number (PIN) that is used to identify the employee and data regarding employee's schedule is entered into the main processing unit 16 (act 210, FIG. 2). The data includes contact information and scheduling information. The scheduling information includes the locations 14 where the employee is supposed to go and at what times the employee is supposed to be at each location. Parameters are preferably set that define a time and time interval (frequency or period) in which the employee is supposed to log into the verification system 10 and are preferably set by a supervisor (act 220).

Once the employee 12 arrives at a client's location 14' (act 230), the employee 12 contacts the main processing unit 16 from the client's location 14 (act 240) and enters the employee's PIN (act 250). In the preferred embodiment, the employee 12 contacts the main processing unit 16 using the client's communication device 22, preferably a telephone. Alternatively, the employee 12 may send a fax, email, text message, or the like utilizing any technology that allows the system 16 to identify the employee 12 and to identify that the employee 12 is at the specified and expected location 14 and not somewhere else. The main processing unit 16 records the PIN, time, date, and location (act 260). The employee 12 continues to be required to contact the system 16 at regular, specified intervals during his or her shift to ensure that the employee is at the right location and awake at the time they call into the system.

As will be explained in greater detail below, the main processing unit 16 also determines if the employee's 12 parameters have been met (act 270). If the employee 12 has finished her/her shift (decision 280), the employee 12 may log out of the verification system 10 by contacting the main processing unit 16 and entering his/her PIN (act 290) or the system 16 may simply not expect any further employee generated communications or log-ins for that day or shift duration. The main processing unit 16 records the PIN, time, date and location (act 300) and optionally verifies this data against the employee's 12 parameters (act 310) previously set and hence predefined (at 220) by, for example, a supervisor that has assigned the employee to a certain job and work shift. The act of verifying this data (act 310) is preferably substantially the same as act 270 described in greater detail below.

If the employee 12 has not finished his/her shift (decision 280), the employee 12 arrives at the next client location 14" and the method may repeat itself until the employee 12 has finished his or her shift. In one preferred embodiment, the employee 12 optionally contacts the main processing unit 16 upon leaving the client's location 14' using any method described above (act 320) and enters his/her PIN (act 330). The main processing unit 16 then preferably records this data (act 340) and verifies the data against the employee's 12 parameters (act 350). The act of verifying the data (act 350) is preferably substantially the same as act 270 described in greater detail herein.

Figure 3:
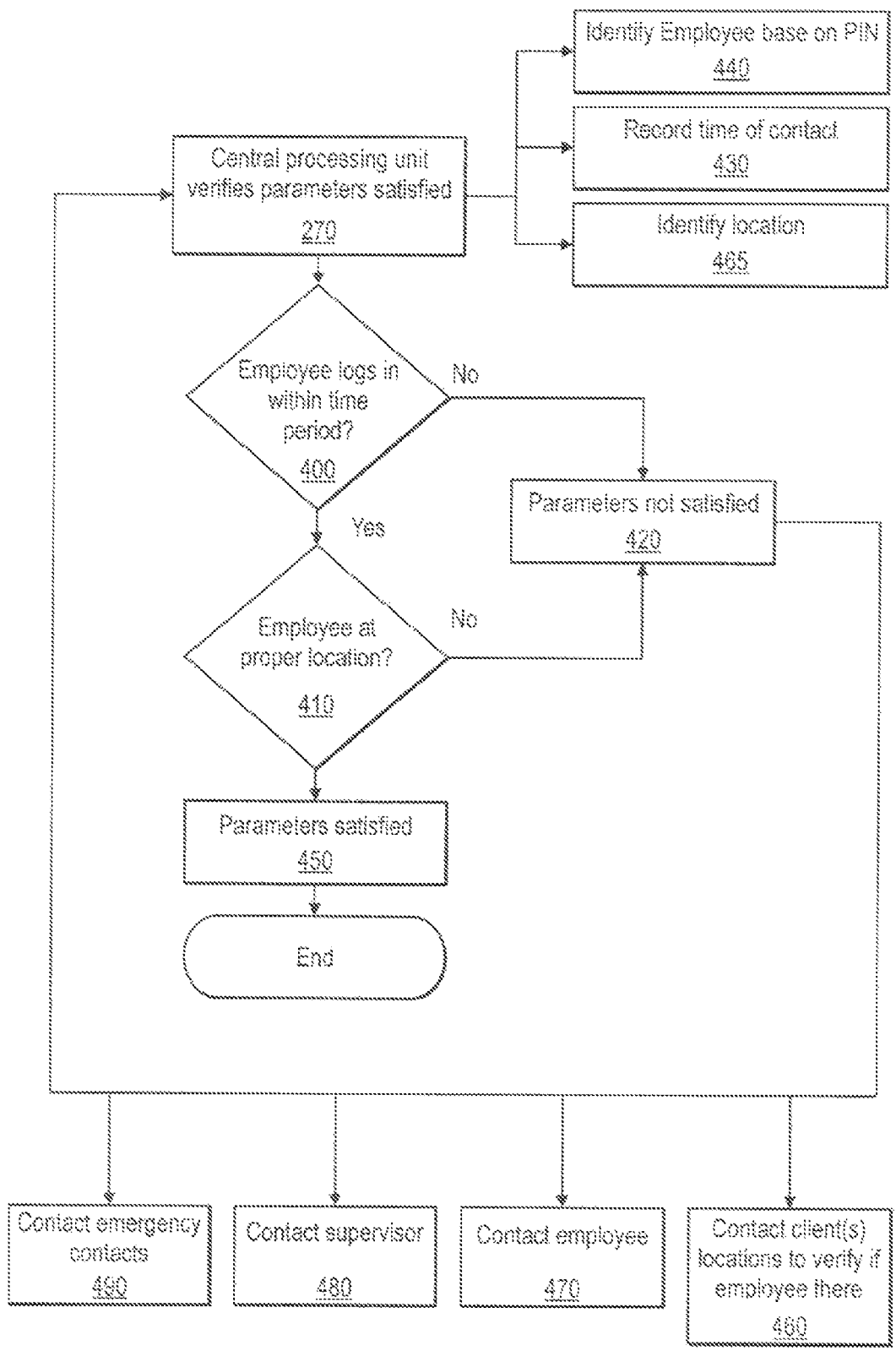
FIG. 3 is a flow chart illustrating one embodiment of the verification act of the verification system according to the present invention.

As discussed above, the present invention verifies whether the defined employee 12 parameters (e.g. expectations about the scheduled contact the employee is supposed to have with the system 16) have been met (act 270). By confirming whether the parameters (expectations) have been met (act 270), the system verifies and helps ensure that the employee is at the proper job site and awake at the time he/she calls into the system. The effectiveness of the employee 12 is therefore increased and the employer can try to increase the possibility that the employee 12 is at work when he/she is supposed to be. Referring specifically to FIG. 3, the verification act (act 270) preferably includes determining whether the employee 12 logs into the main processing unit 16 within or at the allotted time period defined in act 220 (decision 400) and whether the employee 12 is at the proper location 14 set in act 220 (decision 410). If both of these conditions (decisions 400 and 410) are met, then the parameters are deemed to have been satisfied (act 450) and no further action is preferably taken. If either of these conditions (decisions 400 and 410) is not met, the parameters are deemed not to have been satisfied (act 420).

The identity of the employee 12 is preferably determined based on the PIN entered by the employee 12 (act 440). The act of determining whether the employee 12 contacts the main processing unit 16 within the allotted time period (decision 400) is preferably performed by comparing the predetermined time period parameter (430) established in act 220 with the time that the employee 12 contacts the main processing unit 16. Of course, if the employee 12 fails to contact the central processing unit 16, this parameter (decision 400) is not satisfied and the parameters are not met (act 420). The act of determining whether the employee 12 is at the proper location 14 (decision 410) preferably includes identifying the current location 14 of the employee 12 (act 465) and comparing it with the location data established in act 220. The current location 14 is preferably determined (act 465) using automatic number identification (ANI) or similar data available from a telephone or cell phone and looking up that information in the system's 16 database. In the event that either of these parameters is not met (act 420), the present invention (at steps 480, 490) may either immediately attempt to contact a third party 30, FIG. 1 such as a supervisor, family member or other caregiver; log the information and generate a report at the end of a shift for a supervisor which may be printed, emailed, faxed or otherwise made available to the supervisor/caregiver or other responsible party. Such a report can be scanned and organized by the responsible party.

For example, the verification system 10 may attempt to contact the location 14 which the employee 12 is supposed to be located (act 460), may attempt to contact the employee 12 (act 470), notify a supervisor or manager (act 480), and/or notify 490 the emergency contacts (family member, support agency, police, fire, paramedics, etc.). The verification system 10 may attempt to contact any of the above by using any method known to those skilled in the art including, but not limited to, telephone, email, fax, page, text message or the like.

The parameters defined in act 220 also preferably include triggering events/criteria that define which of the acts (acts 460, 470, 480, 490) are performed and when. For example, the triggering events may define that a call should be first placed to the employee 12 within the first 15 minutes. If no response is received, then a message (such as an email) is sent to the supervisor and a call is placed to the location 14" where the employee 12 is supposed to be (and optionally the location 14' where the employee 12 was previously). If no response is received within 30 minutes, emergency contacts may be notified.

By verifying that the employee 12 logs in at the correct time and location (decision 400 and 410), the safety of the patient(s) and the effectiveness of the employee is increased. For example, by monitoring the time and location of the employee 12 through the employee's schedule allows others to know where the employee is/was throughout the day and whether the employee was awake during each or many parts of his shift. In the event that the employee 12 fails to satisfy these parameters (decisions 400 and 410), appropriate steps 480, 490 (for example) can be taken to safeguard the patient and/or employee 12. Additionally, the employer can monitor performance of the employee 12 and ensure that the employee is performing all of his/her duties at the appropriate location and time.

Figure 4:
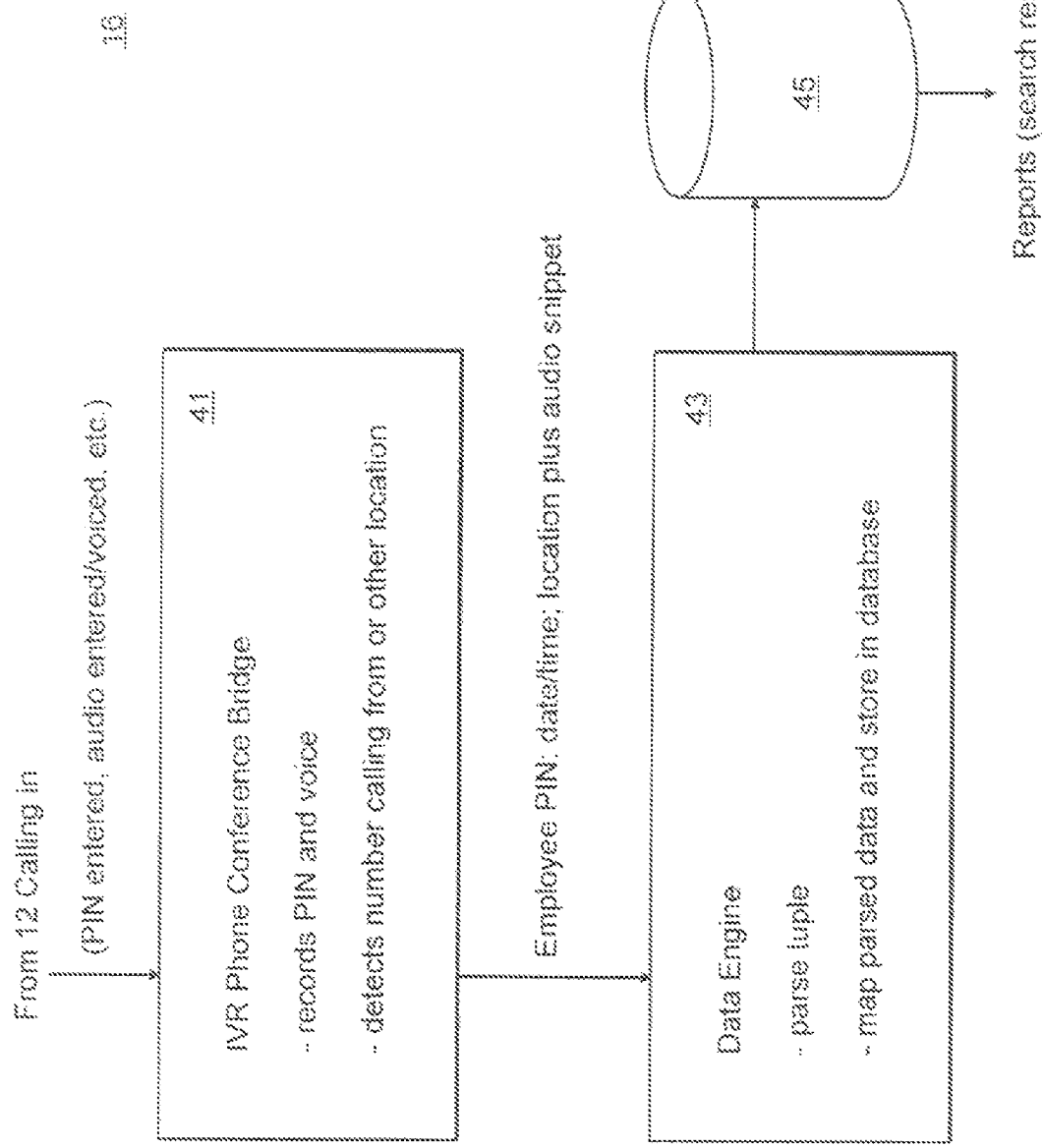
FIG. 4 is a block diagram of the main processing unit in various embodiments of the present invention.

To that end, embodiments of the present invention generate various reports, automated employer alerts/messages and other output, and provide to the employer ready access to collected data from the foregoing monitoring the employee. The collected data serves as third party verification of the employee's presence (location, whereabouts, or the like) and state of being awake (alertness, effectiveness, etc.) For example, each monitored data triplet includes employee identifier (PIN), date/time and location information (phone number employee is calling from, positional latitude/longitude, etc.). FIG. 4 further illustrates the data captured by the present invention monitoring.

System Architecture

In one embodiment, the contact center (main processing unit) 16 utilizes a phone conferencing bridge 41 (FIG. 4) to receive the employee phone calls. Preferably the phone conferencing bridge 41 is based on interactive voice response (IVR) technology. IVR is a telephony technology in which a user uses a touch-tone telephone to interact with a database to acquire information from or enter data into the database. In each instance (employee phone call), the phone conferencing subsystem 41 answers the employees phone call, captures the PIN entered by the employee during the phone call, and records the brief message voiced by the employee as part of the phone call. The phone conferencing subsystem 41 also records date and time of the phone call as well as location that the phone call came from (i.e., a detected phone number that the employee is calling from, or similar information).

The phone conferencing subsystem 41 packetizer otherwise forms the data triplets (tuples) with each employee call into the bridge conferencing phone number. In turn, the phone conferencing subsystem 41 forwards each data triplet to a data engine 43. As illustrated in FIG. 4, the data tuple preferably includes employee PIN or user identifier, date/time, indication of location and an audio snippet of the employee's voice message.

Data engine 43 parses the data triplets (tuples) in response to phone conferencing subsystem 41 output. Data Engine 43 maps the parsed data to database tables, records and rows and columns for storage. For example, using an employee-ID table, the employee entered PIN number is mapped and transferred to the spelled out version of the employee's name. Using Caller ID technology, the phone number of the phone that the employee used to place the call is mapped to the corresponding street address or similar geographic location. The audio snippet is matched against a prerecording of the employee's voice (at 210) using IP telephony or VOIP technology. Each of these elements (spelled out version of employees name, location address, date/time and audio snippet with verified match flag) are stored in the database 45. The database server 45 hosts a searchable database system, for example, of SQL, Oracle, relational or other type of database.

Figure 5:
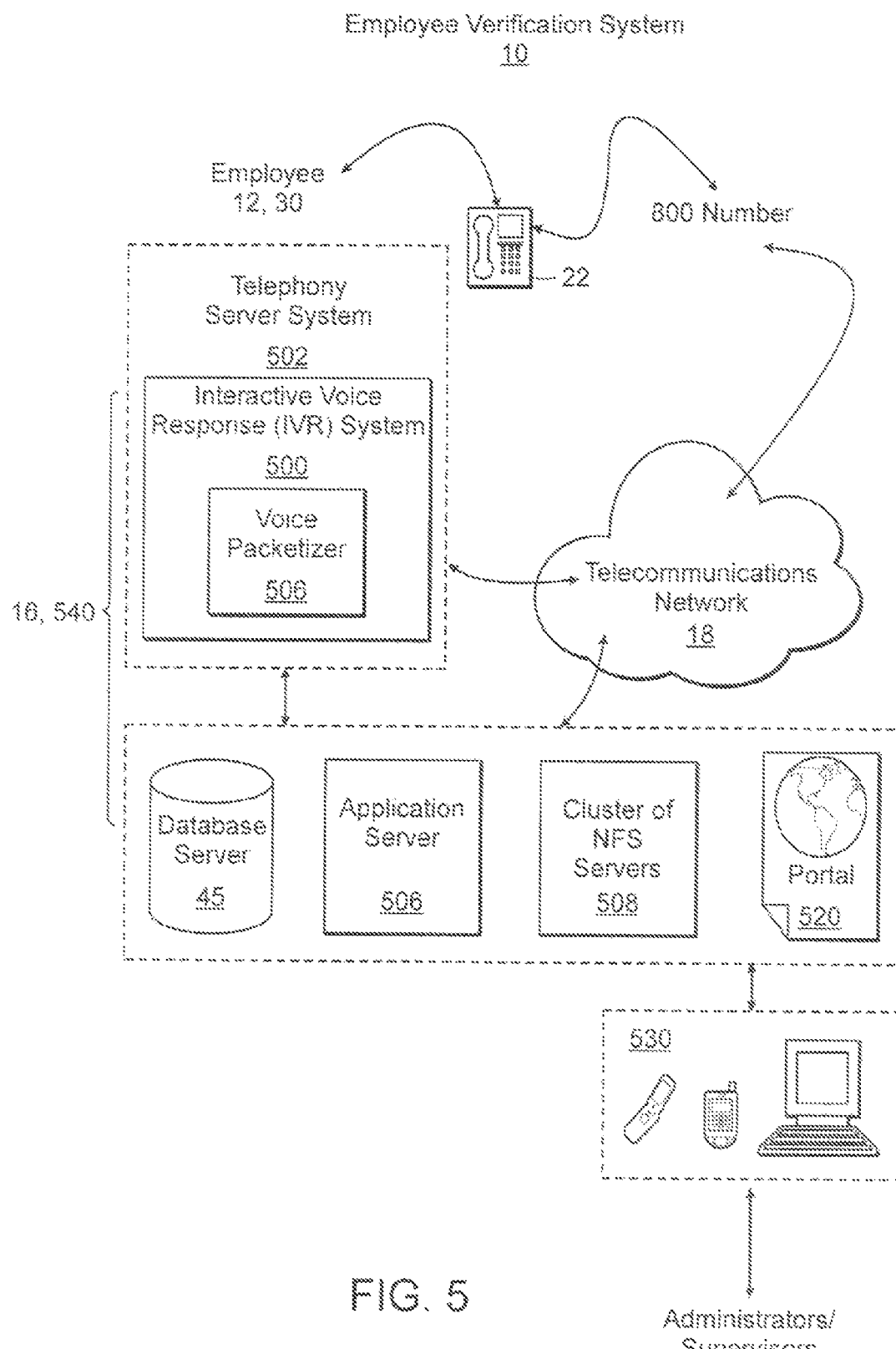
FIG. 5 is a block diagram of the computer system architecture of the employee verification system according to various embodiments of the present invention.

A preferred architectural implementation specifically in regard to the handling of voice communications, is shown in greater detail in FIG. 5. In this example implementation, phone calls come into a telephony server system 502 through an 800 number on a T-1 line, such as Paetec Primary Rate Interface (PRI) T-1 lines. The telephony server 502 accesses the 800 number's DNS digits, processes the PRI called ID tag, and from the DNS digits knows to play the associated recording and then prompt for the 4-digit employee ID code. The employee caller enters in their ID code and the telephony server 502 passes this out a port HTTP to an application server 506, then the application server requests a lookup of the ID in the database server 45.

An application server system 506, implemented using a conventional application server computer platform and executing a standard distribution of the Linux Operating System, provides for the execution of the phone application programs. The database server 45 verifies that this is an active code and responds back to the application server 506, which instructs the telephony server 502 to play the option for the caller to leave a message.

The telephony server 502 is told that what is coming next is a voice message and the voice message is handed off to a cluster of NFS servers 508. The information collected by the phone and app servers 502, 506 is stored on the database servers 45. When a web lookup is performed by the supervisors, for example, in the portal 520, the web application in the application server 506 accesses the content in the database server 45 and displays it in the databases form specified according to the supervisors' respective preferences. When an e-mail notification to the supervisors is sent out, the e-mail program in the application server 506 sends out to an SMTP cluster and Paetec sends it out through an Ethernet handoff, preferably implemented by Budget Conferencing technology (Budget 6.0M).

The telephony server system 502 executes a computer telephony integration application that, in combination with the voice packetizer 504, preferably implements the interactive voice response (IVR) system 500 that allows the telephony server system 502 to effectively handle and respond to incoming voice calls (e.g. awake overnight telephone calls from employees). The information gathered from the awake overnight telephone calls, among other data, includes:

(1) Dual Tone Multi-Frequency, the system used by touch-tone telephones, of the ID that the overnight staff employee types in after the telephony server plays our message;
(2) DTMF of a second security code; and
(3) The originating telephone number or caller ID of the caller.

The telephony server 502 prompts the awake overnight staff employee with an option to leave a message. This is handled by the IVR system 500

Voice Extensible Markup Language (XML) can be used in connection with, among other things, the voice rendition and recording of spoken input process. Voice XML is generally designed for creating audio dialogs that feature synthesized speech, digitized audio, recognition of spoken and DTMF Key Input, recording of spoken input, telephony, and mixed initiative conversations. Voice XML is an industry standard protocol for IVR.

Alert System

Because the invention uses IVR technology, the inventive system can provide a more comprehensive, versatile and faster system, compared with prior systems that use a traditional conference bridge with an SMDR data feed to a database server. SMDR data feeds, for example, are generally not on a real-time conferencing bridge and, therefore, it is typically only practical to run batch files once an hour or half hour.

The system 540 (alert system) can provide, however, real-time notification, where the supervisor is notified with an alert in real-time when a staff member is late for a call. Supervisors can use various computing components 530, such as cell phones, PDAs, etc. to access and receive these notifications. Such real-time notifications can be set individually with different times per customer and per time zone. The system 540 can delay alerts to supervisors based in a specified time window to allow a staff member extra time to call the system 540 if the staff member is running late with his or her scheduled call-in.

With prior systems that rely on a traditional conferencing bridge, a real-time alert system 16, 540 would generally be very difficult, if not impossible, to program individually for every customer. Further without using IVR technology, the system 16, 540 would likely not be able to implement a web-based portal 520 of the calls made per house, maintained in real-time. With the system 16, 540, supervisors who receive an e-mail notification of a missed call (Real-time Notification) can go to the web portal 520 and determine if a call was made later in the hour.

In this way, the inventive employee monitoring system provides an alert system 540. If staff do not call when they are expected, the alert system 540 sends to a supervisor an e-mail saying that a call, for example, is at least 15 minutes late. Supervisors interface with the alert system 540 using the portal 520. The invention can include a feature that directs the system 16, 540 to automatically call the home if staff are late with their phone calls. These reminders will encourage the staff to call and check-in with the system. The invention also can include an option to automate an outbound telephone call to alert agency supervisors to a potential problem if staff does not call in.

Thus, the present invention can provide, for example, an awake overnight reporting system for monitoring the caregiving staff for health and human services organizations. The awake-overnight staff calls an 800 number hourly during the night and enters an ID code and a PIN Code to prove that they are on site and awake. Preferably, they have to call from the house phone, which the system 16, 540 monitors by capturing the caller id of these calls. Staff callers are also asked to record their name, which can be stored in a sound file, such as a wave file, so that agency supervisors can confirm the caller's identity through an authentication process. From these calls, the invention generates real-time reports accessible through an Intranet portal of missed and received calls. Missed messages can be sent out, and call reports can be automatically sent to supervisors and the like via e-mail.

Portal System

The present invention provides a user-interface to search and retrieve data from the database 45. The user-interface can be, for example, a web-based portal 520. FIGS. 6A-6C are screenshots of the interface of an example portal 520 according to an embodiment of the invention. A supervisor or other user can use the portal 520 to search the database 45 by employee name, date/time, location in question and the like. This can be done substantially in real-time, during the employee's shift, or at other times.

Call Log, Calls Made

The supervisory staff can log onto the intranet site portal 520 with their username and password and view real-time all calls that staff have made, organized by House. As shown in FIG. 6A, the fields include, Location Name 602, Staff Name 604, ID 606, Date and time 608 of call, and originating telephone number of call 610.

Missed Call Notification

There are several methods that can be used to advise supervisory staff about awake overnight missed telephone calls. Missed calls are defined by the parameters specified by supervisory staff and are reported if the calls are 15 minutes late from the expected time of receipt. For instance, if calls are expected hourly for an 11 AM to 7 PM shift every hour between 12 PM and 6 AM, missed calls would be reported 15 minutes after each hour between 12 PM and 6 AM.

If the system 16, 540 detects a missed call, the basic alert reporting system includes:

(a) the supervisors designated receive an e-mail saying "SteadyCare (name of house) was scheduled for a check in at (location), but it is currently at least 15 minutes late;" and (b) supervisors can look at a real-time missed call reports 616 on the portal 520.

Enhanced alert features include:

(a) Text message notification via e-mail to cell phones;

(b) Outgoing telephone calls to the house phone to attempt to wake staff up; and (c) Outgoing telephone calls to supervisory staff on call that night that lets them know a call was missed.

Portal Access and Daily/Monthly E-mail Reports

The system 16, 540 provides access for an agency's residential supervisors, directors, officers and HR staff to a powerful intranet portal 520. This portal 520 preferably shows the agency's residential supervisors all calls that awake overnight staff made for every house, all calls that were missed for every house, the location schedule for expected call-ins. Administrative supervisors and staff have the option to update to ID 606 correlations so that they know how their employees ids are designed, and to update originating telephone number 610 to location name correlations 602, and employees 604 and their work schedules in the organization's various homes. As featured reports, the residential supervisors are immediately alerted to the last ten missed calls 614 and the last ten made calls 618 to that house when they open the portal 520 for the house so that they can quickly scan and check entries.

The basic reporting system includes downloadable reports 616 from the portal intranet site for a daily e-mail report 612 that includes the last ten missed calls 614 and the last ten received calls 618, which is automatically e-mailed to the recipients designated by the organization.

An additional monthly report 720 (see FIG. 7A) is available that is sent automatically that includes the calls made and missed for the entire month. This is primarily intended as an optional automated report for the organization's Human Resources Director and staff.

The present awake overnight reporting/alert system 16, 540 maintains all made and missed call logs, voice recordings, and voice mail messages for 90 days. This information can be downloaded and saved by the organization's supervisory staff at any time. Should the organization wish to automate this process further, a monthly e-mail report can be provided that includes the excel report of all made and missed calls for the agency by house, and is sortable by any field as shown in FIG. 7A. Similarly, FIG. 7B is an example of a daily e-mail report 740 generated by the alert system 540.

End-User Programmable Portal Features

Preferably, the system 16, 540 assigns one lead person and a backup within the organization to have full access to make their own modifications to the program using the portal intranet site 530. This person has the ability to make the following modifications, and access a special calls-made report 616:

(a) Edit 648 the call schedule 640, which provides hours of scheduled check-ins at all homes (screenshot in FIG. 6C shows the edit the call schedule 640 screen that appears in the portal 520 in response to selecting Edit 648);

(b) Add 642 or subtract employees 652 at different houses, allowing the ability to fill-in and schedule employees who work at multiple homes and to account for more than one person at a home;

(c) Change or add e-mail addresses 646 and phone numbers for alert notification purposes;

(d) Change employee names 604, house names 602, and what originating telephone number 622 is associated with what house 602;

(e) The ability to search employee check-ins by ID 606 makes it possible to find and evaluate an employee who works in several homes, especially for HR purposes;

(f) The ability to search for data on a call based on originating telephone number 610 or house 622, where overnight staff did not complete the entering of their ID and PIN code. Here, the dates and times of calls are recorded and noted by the house telephone number 622, but do not know who made the call.

Voice Recording Capability

The system 16, 540 is designed to include an additional verification feature where awake overnight staff is prompted to leave recordings of their names as part of the check-in procedure. Supervisors and HR team of the organization can optionally listen 624 to these recordings to prove by the sound of the voice which staff member made the call. They are available on the portal intranet site 420 and are downloadable as wave files.

In one embodiment, an authentication software process can be provided as part of a component of the interactive voice response system 500. The authentication process can compare at least a portion of the employee recording with a previously stored sample of the employee's voice. The authentication process can confirm the authenticity of the employee recording by verifying that the portion of the employee audio data and the previously stored employee voice sample are substantially the same.

Leave Voice Mail Messages

The portal 520 has a feature that is designed as an optional means of communication between the organization's awake overnight staff and supervisors checking call logs on our intranet site. The option is provided for awake overnight staff to leave a message for supervisors at the end of their awake check-in call. Managers/supervisors can listen 526 to these as a wave file. This can be information about overnight client issues, house management details, etc. For example, the staff can use this feature to leave messages explaining why they may have missed a call.

Capturing Calls Made to the System

The present invention provides a very sophisticated, flexible, and accurate call-in system. Preferably, the system 16, 540 captures the originating telephone number of every call-in that is made to the 800 number as long as the telephone company for the house phone provides outbound caller id information.

If the organization's awake overnight staff call the 800 number and then hangs up the phone, the system 16, 540 will track that the call made, and the organization's designated lead can search for this information.

Secure Database

Where the data of database 45 is generated and maintained by automated means (e.g. 41, 43, see FIG. 4), data integrity is of one of the highest degrees. The call logs stored in the database 45 provide a third party verification log, which can be particularly useful, for example, as evidence in litigation to show whether an employee was at the expected location and properly made the scheduled call-ins to the system. Further, the audio snippets produced by the employees' phone calls add a further level of corroboration (verification) generally unachieved in conventional systems. The database 45 and portal system 520 are designed so that staff employees cannot access the data. Thus, the present invention provides a truly "third party" viable, optimally guarded against manipulation and tampering, verification system.

Other Example Implementations

Although the inventive employee monitoring system can be used in any industry, it is particularly useful for health and human services organizations whose staff take care of the sick, mentally ill, children for adoption, etc. In addition, in-home health care staffing agencies can use the inventive system as a time clock tool for timesheet and billing management.

Accordingly, systems and methods are provided for verifying that a respective employee is at the appropriate location and awake during his or her shift. The systems and methods receive a set of parameters and thus verify that the subject employee is awake or appropriately inferred to be active at the proper location and at the proper time. The systems and methods also increase the patient's safety and/or awareness of the employee's awake and geographically present status by taking appropriate action in the event that the employee does not satisfy the defined parameters.

Figure 8:
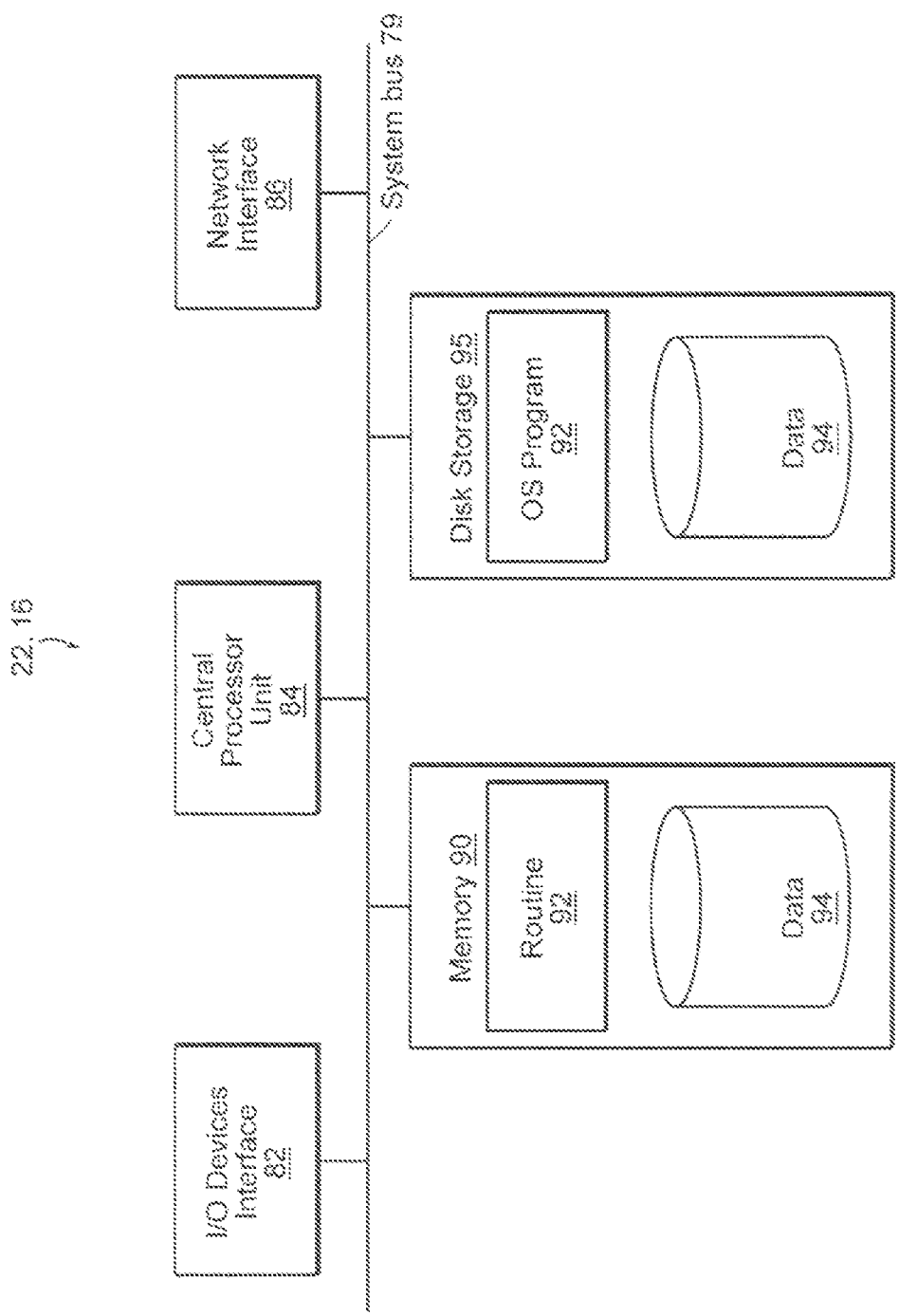
FIG. 8 is a block diagram of a computer node (e.g. client or server) implementing the present invention.

It is understood that the main processing unit 16 (communication devices 22) may include one or multiple computers. Parallel or distributed or other processing architectures may be employed. FIG. 8 is a diagram of the internal structure of a computer (e.g., client processor/device 22, 16 or server computers 16) in the computer system of FIGS. 1, 4 and 5. Each computer 22, 16 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 16, 22. Network interface 86 allows the computer to connect to various other devices attached to a network (e.g., network 18 of FIGS. 1, 5 and 6). Memory 90 provides volatile storage for computer software instructions 92 and data 94 used to implement an embodiment of the present invention (e.g., phone conferencing bridge operations 41, data engine 43, database 45, and other system 10 code/functions and operations detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network and architecture of FIGS. 4 and 5 are for purposes of illustration and not limitation of the present invention.

As mentioned above, the present invention is not intended to be limited to a system or method which must satisfy one or more of any stated or implied object or feature of the invention and should not be limited to the preferred, exemplary, or primary embodiments described herein. The foregoing description of a preferred embodiment of the invention has been presented for purposes of illustration and description. It is not intended to be exhaustive or limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention.

It is important to note that the present invention is not intended to be limited to a system or method which must satisfy one or more of any stated objects or features of the invention. It is also important to note that the present invention is not limited to the preferred, exemplary, or primary embodiments described herein. Modifications and substitutions by one of ordinary skill in the art are considered to be within the scope of the present invention.

What is claimed is:

1. A computer implemented system for monitoring employees comprising:
an interactive voice response (IVR) system executing on one or more computer processors configured to receive audio data providing a representation of an employee, the interactive voice response (IVR) system processing the employee audio data to determine time and location parameters to facilitate creation of real-time alerts;

an alert system executing on one or more processors, in communication with the interactive voice response (IVR) system;

the alert system configured to generate a real-time alert in response to detecting a potential problem condition, where the potential problem condition is detected using defined expectations for the employee audio data received by the interactive voice response (IVR) system, the defined expectations including a scheduled location and a scheduled time frame, including frequency or time periods, for receiving the employee audio data indicative of the employee being awake during many parts of his work shift, where the alert facilitates monitoring of the employee; and the alert system configured to generate the alert with a delay such that transmission of the alert is delayed for a period of time to allow the employee additional time to cure the potential problem condition.

2. A computer implemented system as in claim 1 wherein the problem condition is triggered if at least one of the following occurs:

the employee audio data is not received from the scheduled location, or the employee audio data is not received within the scheduled time frame, or no employee audio data is received.

3. A computer implemented system as in claim 2 further including determining that the employee audio data is not received from the scheduled location by:

determining a geographical location associated with the employee identification data;

comparing the determined geographical location with the scheduled location; and determining the determined geographical location and the scheduled location are not substantially the same;

wherein the geographical location is determined using, at least in part, information about a geographical location of a device from which the employee identification data originates.

4. A computer implemented system as in claim 2 wherein the scheduled location is at least one respective work site at which the employee is expected.

5. A computer implemented system as in claim 2 wherein the interactive voice response (IVR) system is configured to computationally process the employee audio data by:

forming, using a data engine, a data tuple in response to an incoming communication from an employee, the data tuple including at one of: an employee's PIN, or employee's user identifier, or date/time parameters, geographical location, or voice message, or text message;

where the data tuple is employee identification data that received by the interactive voice response system (IVR) and compared with the defined expectations to assess whether a potential problem condition is present.

6. A computer implemented system as in claim 1 wherein the potential problem condition is cured if the employee audio data is received by the expiration of the period of time of the delay.

7. A computer implemented system as in claim 2 wherein the alert is transmitted if the potential problem condition is not cured by the expiration of the period of time of the delay, the alert indicting a missed check-in by the employee.

8. A computer implemented system as in claim 1 wherein the system provides third party verification of at least one of: the employee has complied with a required checked-in to a work shift, or the employee has missed a scheduled check-in to a work shift.

9. A computer implemented system as in claim 1 further including an administrator profile implementation process enabling an administrator to define preferences for receiving electronic alerts in real-time;

the computer implemented system including an administrator notification preference enabling a supervisor to define the type of electronic alert to be received, where the type of alert is at least one of the following: an instant message, text message, a telephone call, voicemail message, or an email.

10. A computer implemented system as in claim 9 further including a telephony server system, interfacing with a voice packetizer, the telephony server system executing a computer telephony integration application that, in combination with the voice packetizer, implements the interactive voice response (IVR) system enabling the telephony server system to handle and monitor incoming communications from an employee.

11. A computer implemented system as in claim 1 wherein the interactive voice response (IVR) system enables the alert system to generate real-time electronic alerts.

12. A computer implemented system as in claim 1 wherein an employee audio data includes a representation of an employee's voice;

the system further including: an authentication process, in communication with the interactive voice response (IVR) system, comparing at least a portion of the employee identification data with a previously stored sample of the employee's voice; and the authentication process confirming the authenticity of the employee identification data by verifying that the at least one portion of the employee identification data and the previously stored employee voice sample are substantially the same.

13. A computer implemented system as in claim 3 wherein the determined geographical location is based on a detected phone number that the employee is calling from.

14. A computer implemented system as in claim 2 wherein the employee is monitored remotely while working at the scheduled location.

15. A computer implemented system as in claim 1 wherein the alert system is designed to intentionally delay the electronic alert during the delay period to allow the employee additional time to call into the interactive voice response (IVR) system.

16. A computer implemented system as in claim 15 wherein during the delay period, the interactive voice response system (IVR) attempting to contact an employee by sending one or more communications to the scheduled location where an employee is supposed to be; and if no response to the one or more communications is received, the alert system transmitting the electronic alert.

17. A computer implemented system as in claim 1 wherein the alert system and the IVR system are components of a cloud server system.

18. A computer implemented system of monitoring employees as in claim 2 wherein in response to the delay, including at least one of:

sending a text message to a device associated with the employee, or sending an email to a device associated with the employee, or calling a device associated with the employee, or calling a device associated with the scheduled location at which the employee is supposed to be present.

19. A computer implemented system of monitoring employees as in claim 2 wherein the telephony application server executes a computer telephony integration application that, in combination with a voice packetizer, implements the interactive voice response (IVR) system.

20. A computer implemented system of monitoring employees as in claim 1 wherein the employee is at least one of: an agent, supervisor, home healthcare worker, or any person.

\* \* \* \* \*